UNITED STATES PATENT OFFICE.

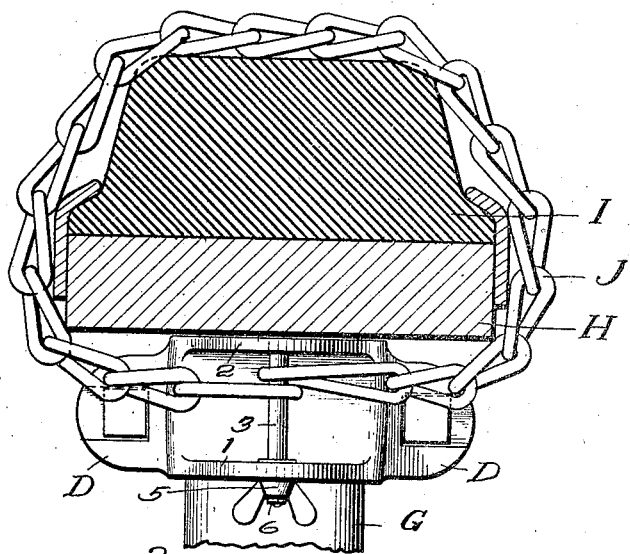
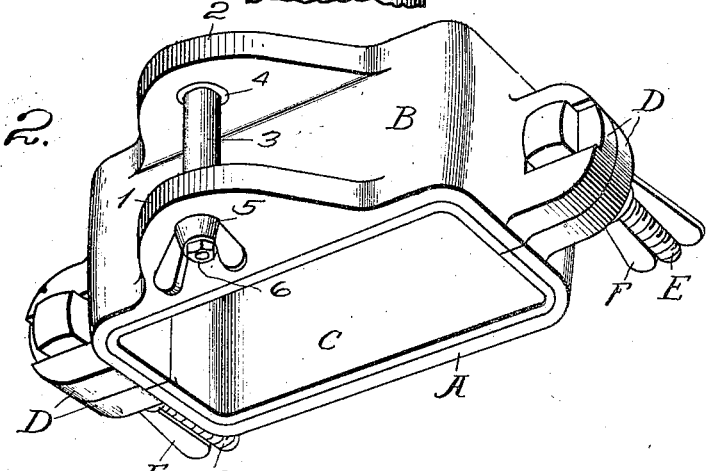
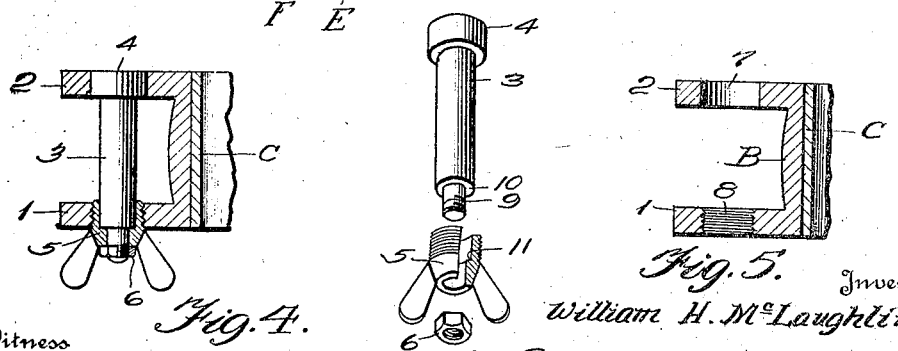

WILLIAM H. McLAUGHLIN, OF HARTFORD, CONNECTICUT, ASSIGNOR TO CASSIUS S. CHASE, OF HARTFORD, CONNECTICUT.

ANTISKIDDING DEVICE.

1,263,087.  Specification of Letters Patent.  Patented Apr. 16, 1918.

Application filed November 2, 1917. Serial No. 199,845.

*To all whom it may concern:*

Be it known that I, WILLIAM H. MC-LAUGHLIN, a citizen of the United States, residing at Hartford, in the county of Hartford and State of Connecticut, have invented certain new and useful Improvements in Antiskidding Devices, of which the following is a specification.

This invention relates to anti-skidding devices, more particularly to one of the plates or members of a two-plate clamp employed therein, and resides especially in the means for readily securing thereto or therein the links of a chain or part or parts of some element or elements, in the arrangement and combination of parts to prevent the separation of said means from said plate while the latter is in normal or operative position on the wheel spoke, and in provision for locking said means in position.

The invention hereinafter set forth has for its primary object to provide one of the plates of the clamp, forming a unit of the anti-skidding device, with a pin arranged at an interval from the parallel face thereof and having a portion, in normal position, located between two rigid surrounding parts, which pin is to have releasable locking means permitting it to be released and moved endwise slightly so that the links of a chain may be slipped over the end of the pin and, when it is locked in its normal position, held by the portion of said pin between said rigid parts. Other objects are to so form the pin, clamp plate and locking means that the pin cannot be separated from said plate until the locking means are removed from the pin and the clamp plate has been removed from the spoke to provide sufficient clearance adjacent the outer end of the pin to allow it to be moved lengthwise in the direction of said end until clear of said rigid parts; to combine in the locking means the two functions of locking the pin and of a powerful pulling and pushing device to pull the pin free in case it gets stuck by freezing or other causes and to push it back into position after the chain links have been slipped over the end thereof in case the hole 7 or the part 4 of the pin is clogged or coated with ice, mud, dirt or other obstructive agent.

Further objects are to improve and simplify such devices, to simplify and improve the locking means, and to reduce the cost of manufacture of such articles, while increasing their efficiency and durability, all of which objects are accomplished by the construction, combination and arrangement of parts all as hereinafter more particularly set forth, described and claimed.

In the accompanying drawings, in which only the preferred form is illustrated:

Figure 1 represents a front elevation of a clamp applied to the spoke of a wheel in accordance with my invention;

Fig. 2 represents a perspective view of the clamp by itself;

Fig. 3 represents a perspective view of the pin, locking nut and guard nut in superposed relation, the locking nut being broken away;

Fig. 4 represents a cross-sectional view through the flanged plate B, the pin 3 being shown in side elevation; and Fig. 5 represents a similar view, the pin being omitted.

Referring now in detail to the drawings, A and B indicate the respective clamp plates having a rubber treated lining C and provided with perforated end flanges D for the reception of bolts E on which wing nuts F are screwed to draw the two plates toward each other on the outer portion of a spoke G of the wheel, with the flange 2 of plate B against the inner face of the felly H, on which is mounted the tire I. J indicates one of the transverse anti-skidding chains of the fixed point or anchored type.

The plate B is provided with two projecting parts or flanges 1 and 2, preferably, though not necessarily, integral therewith and preferably parallel to each other. The flange 1 is provided with an internally screw-threaded perforation 8 and the flange 2 is provided with a hole 7, which is of greater diameter than the perforation 8. Hole 7 and perforation 8 have a common axial line.

A pin 3 is inserted through the hole 7 of the flange 2 and is provided with a preferably integral enlargement 4 at one end, which enlargement is of such size and shape as to fit snugly in the hole 7, but is too large to pass through the perforation 8. This pin 3 may be inserted through the hole 7 and through perforation 8 until the enlargement 4 strikes against the face of flange 1 adjacent to perforation 8.

The other end of pin 3 is provided with a shoulder 10 and a reduced stem 9, which has its outer end portion screw-threaded. A locking nut or externally screw-threaded sleeve 5, which is preferably provided with wings and has an internal shoulder 11, is slipped over said stem until its shoulder 11 abuts against the shoulder 10 of pin 3, when the threaded part of stem 9 will extend beyond the face of nut 5. A guard nut 6 is then turned on the threaded part of stem 9 and holds locking nut 5 against movement longitudinally of said pin 3 while permitting it to rotate freely thereon. As thus assembled the pin 3 may be shoved through the perforation 8 until the threads of the nut 5 engage with the threads of the walls of said perforation 8, when the nut 5 is to be rotated in the correct direction to force the pin 3 into normal position with its enlarged portion 4 fitting snugly in the hole 7.

The clamp plates A and B are now ready to be attached or secured to the spokes G of a truck wheel with the flange 2 of plate B in engagement with, or closely adjacent to, the inner face of the felly H of said wheel, as shown in Fig. 1. As the nut 5 is too large to pass entirely through the perforation 8 and as, when mounted as shown in said figure and above described, the felly will prevent any outward travel through the hole 7, it is obvious that the only way in which the pin 3 can be removed from the plate B, or a new pin inserted, is by the removal of the clamp plates A and B from the spoke and the removal of the nuts 6 and 5, when the pin 3 may be worked out through the hole 7.

By reason of the above described construction and combination it is obvious that the pin 3 can only be removed from the flanges and separated from the plate B by the removal of the clamp plates A and B from their normal position on the spoke, either entirely from the spoke or to some other position on the spoke, in order that sufficient clearance may be provided between the inner periphery of the felly and the adjacent face of plate B to allow the pin 3 to be withdrawn through hole 7 after nuts 6 and 5 have been removed from said pin 3.

To guard against the guard nut 6 being worked loose or off by the lock nut 5 the nut 6 will be threaded in the reverse direction to the threads of nut 5, or other suitable methods or means may be adopted to obviate this trouble.

In use, the lock-nut will be turned outwardly, when its outer face will engage the adjacent face of nut 6 and through it and stem 9 pull the pin 3 toward the hub of the wheel exerting a great leverage, in case the enlarged end 4 is stuck in hole 7 by freezing or other causes, to free the pin 3 from flange 2. As soon as the enlarged end 4 is free and the threads of nut 5 are free from the threads of the wall of perforation 8, the pin 3 may be shoved outwardly partially through flange 1 to allow the links of the two end portions of the anti-skidding chain J to be slipped over the enlarged end 4, when the above operations will be reversed and the shoulder 11 of nut 5, bearing on shoulder 10 of pin 3, will force said pin toward flange 7 until the enlarged end 4 is in normal position in hole 7.

Any suitable materials may be used for any parts.

Having thus described my invention, what I claim as new and desire to secure by Letters Patent is:

1. Two rigid perforated parts, a part normally located in the perforations of said parts and adapted to receive the terminal links of a chain, and means for locking said part in normal position, in combination with a wheel on which said perforated parts are fixedly mounted with one of said perforated parts adjacent to a relatively fixed part of said wheel in the direction of the axial line of the perforations of said perforated parts.

2. A plate having two perforated flanges, a pin normally located in the perforations of said flanges and adapted to receive the terminal links of a chain, and means for locking said part in normal position, in combination with a wheel on which said plate is fixedly mounted with the outer face of one of said flanges adjacent a relatively fixed part of said wheel.

3. A clamp comprising two plates to fit on the spoke of a wheel, one of said plates being provided with flanges having perforations, a pin normally located in said perforations and adapted to receive the terminal links of an anti-skid chain, and means for locking said pin in normal position, in combination with a wheel to one of the spokes of which said clamp is applied closely adjacent the inner periphery of the felly, the outer end of said pin being of greater size than the perforation in the flange of said plate nearest the hub of the wheel.

4. A clamp comprising two plates to fit on the spoke of a wheel, one of said plates being provided with flanges having perforations, a pin normally located in said perforations and adapted to receive the terminal links of an anti-skid chain, and screw-threaded means engaging threads in the inner flange and acting on said pin to lock it in normal position or to move it longitudinally in either direction, in combination with a wheel to one of the spokes of which said clamp is applied with its outer flange adjacent the inner periphery of the felly of the wheels, the outer end of said pin being of greater size than the perforation in the inner flange of said plate.

5. A clamp comprising two plates to fit on the spoke of a wheel, one of said plates being provided with flanges having perforations, the perforation in the outer flange being larger than the perforation in the inner flange, a pin normally located in said perforations with its outer end snugly fitting the perforation in the outer flange and of such size as will not pass through the perforation in the inner flange, said pin being adapted to receive the terminal links of an anti-skid chain, and means for locking said pin in normal position, in combination with a wheel to one of the spokes of which said clamp is applied adjacent the inner face of the felly, which prevents the separation of said pin from said clamp plate while the clamp is in normal position on said spoke.

6. In an anti-skid device for vehicle wheels, the combination with the spokes, felly and tire, of a clamp attached to one of the spokes near the felly and having a circumferentially extending plate lying against the inner face of said felly and provided with a radial pin, and a cross chain extending around the tread of the tire and having both ends attached to said pin.

7. In an anti-skid device for vehicle wheels, the combination with the spokes, felly and tire, of a clamp attached to one of the spokes near the felly, and provided with a radially extending pin, and a cross chain extending around the tread of the tire and having both of its ends attached one over the other to said pin.

In testimony whereof, I have signed my name to this specification in the presence of two subscribing witnesses.

WILLIAM H. McLAUGHLIN.

Witnesses:
    E. S. Bestor,
    H. E. Finnegan.